No. 732,382. PATENTED JUNE 30, 1903.
F. M. & W. R. TEEGUARDEN.
FEED MECHANISM FOR SHREDDING MACHINES.
APPLICATION FILED OCT. 11, 1902.
NO MODEL. 2 SHEETS—SHEET 1.

WITNESSES:
F. W. Woerner.
D. Mahlon Ungh.

INVENTORS:
William R. Teeguarden
Freeman M. Teeguarden
BY Joseph A. Minturn,
ATTORNEY.

THE NORRIS PETERS CO., PHOTO-LITHO., WASHINGTON, D. C.

No. 732,382. PATENTED JUNE 30, 1903.
F. M. & W. R. TEEGUARDEN.
FEED MECHANISM FOR SHREDDING MACHINES.
APPLICATION FILED OCT. 11, 1902.
NO MODEL. 2 SHEETS—SHEET 2.
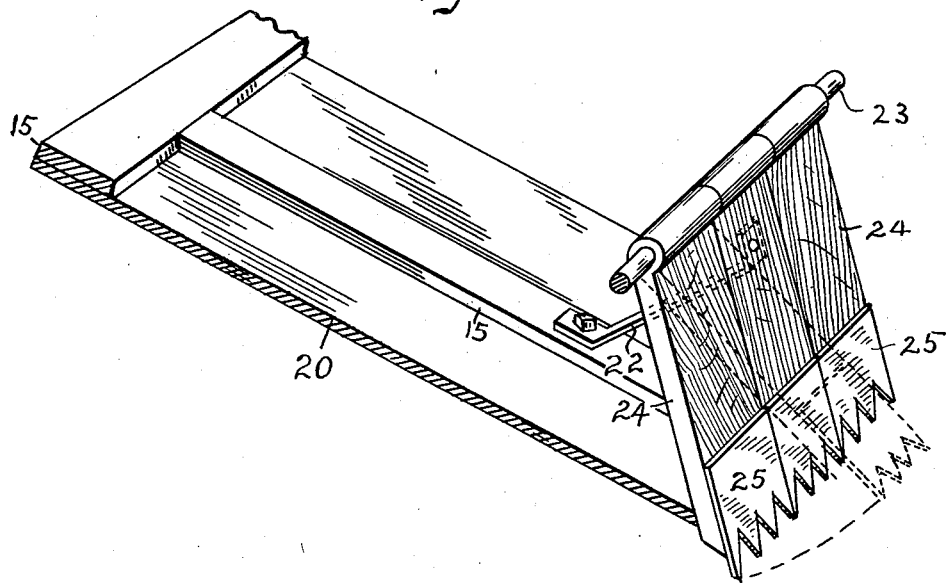

No. 732,382. Patented June 30, 1903.

UNITED STATES PATENT OFFICE.

FREEMAN M. TEEGUARDEN, OF COLFAX, AND WILLIAM R. TEEGUARDEN, OF INDIANAPOLIS, INDIANA.

FEED MECHANISM FOR SHREDDING-MACHINES.

SPECIFICATION forming part of Letters Patent No. 732,382, dated June 30, 1903.

Application filed October 11, 1902. Serial No. 126,813. (No model.)

*To all whom it may concern:*

Be it known that we, FREEMAN M. TEEGUARDEN, residing at Colfax, in the county of Clinton, and WILLIAM R. TEEGUARDEN, residing at Indianapolis, in the county of Marion, State of Indiana, both citizens of the United States, have invented certain new and useful Improvements in Feed Mechanisms for Shredding-Machines, of which the following is a specification.

This invention relates to machines for shredding fodder; and the object of the invention is to provide a feeding device which will feed the cornstalks to the snapping-rolls in a regular and uniform manner and with absolutely no danger of bodily injury to the operator supplying the fodder to the machine.

The object also is to provide a feeding device which will not clog when the fodder is thrown into the machine in larger quantities or bunches than is warranted by the capacity of the machine. When the fodder and corn are placed on the carrier in large bundles, the pusher traveling forward at a greater speed than the carrier the pusher or feeding device which we provide scatters the fodder in a manner to make a more even amount of material to pass through the snapping-rolls and a better chance is afforded to remove the ears of corn from the stalks without shelling the corn from the ears.

A further object of the invention is to provide a feeding device which is simple and easy to construct and to operate, inexpensive as to first cost, and which requires little power to drive.

We accomplish the objects of the invention by the mechanism illustrated in the accompanying drawings, in which—

Figure 1:
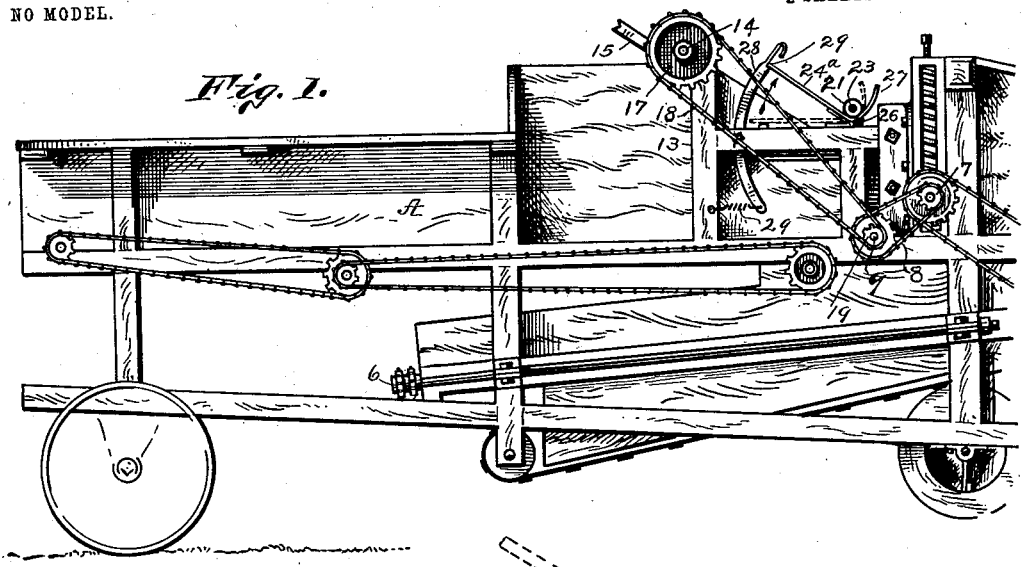
Figure 2:
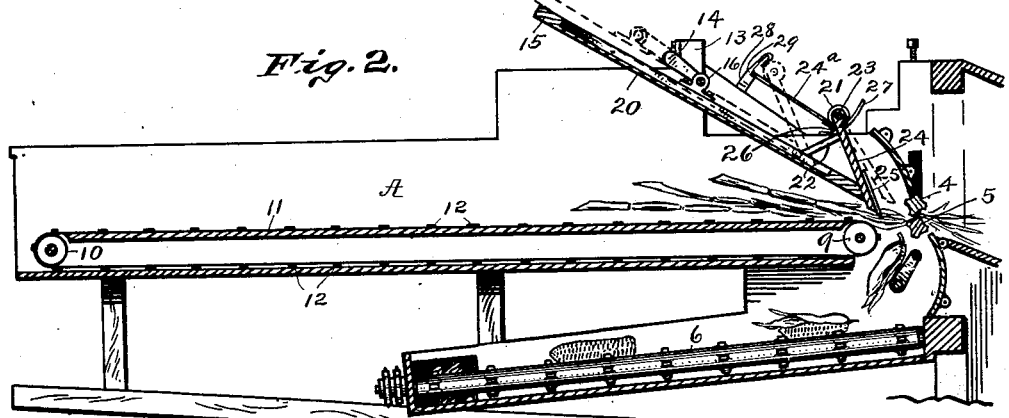
Figure 3:
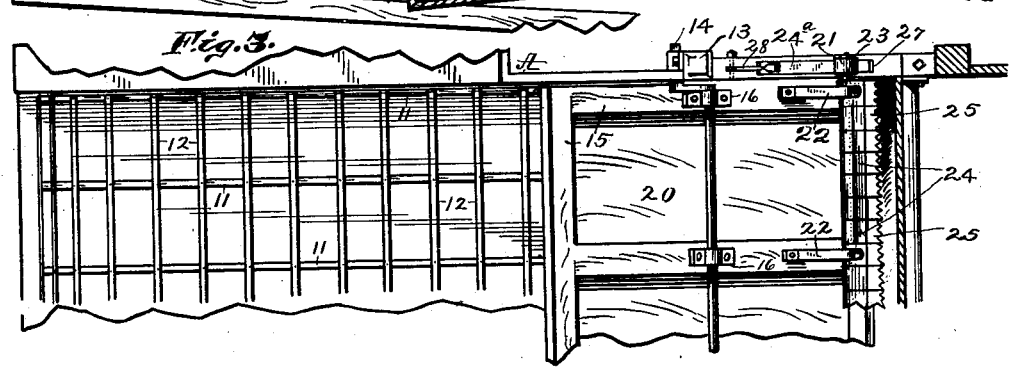

Figure 1 is a detail in side elevation of the front or feed end of a corn-shredder provided with our invention; Fig. 2, a longitudinal central section of same, and Fig. 3 a partial plan view of the same part of the machine which is shown in the other two views. Fig. 4 is a detail in perspective, showing the construction and application of the flexible fingers.

Like characters of reference indicate like parts throughout the several views of the drawings.

A is the body or framework of a corn-shredder of any usual and well-known construction.

4 and 5 are the snapping-rolls, where the ears of corn are snapped from the stalks, and 6 represents the husking-rolls, upon which the snapped ears fall as soon as detached from the stalks. The latter pass between the snapping-rolls to the shredding mechanism. (Not shown.)

All of the above-described parts are of usual and well-known construction.

The shaft for the top snapping-roll has a sprocket-wheel 7, which is connected by the link belt 8 with a sprocket-wheel on the shaft of a roller 9. At the front end of the machine is a similar parallel roller 10, and passing around both rollers are the belts 11, which are connected by the slats 12, forming a carrier upon which the fodder is laid by the assistants. The carrier is driven by the belt connection above mentioned.

Mounted in suitable bearings on standards 13 13 is a shaft 14, extending transversely of the machine. This shaft is bent down at right angles just inside of said standards and then inwardly in a lateral direction, thereby forming a crank, as clearly shown in Fig. 3. To this cranked portion a frame 15 is hinged by the straps 16. A revoluble motion is given to the cranked shaft thus formed by means of a sprocket-wheel 17 on the extended end of said shaft and a belt 18, connecting said sprocket-wheel with the sprocket-wheel 19 on the roller-shaft 9. The frame is made solid by the under side plate 20, preferably of sheet metal. This frame stands obliquely, as clearly shown in Fig. 2, and contact of its lower end with the carrier passing over roller 9 is prevented by the rollers 21, which are mounted on a shaft 23, braced by brackets 22 and supported on track 24ª. The brackets are bolted to the frame 15. The rollers 21 have runs upon tracks 24ª, supported upon the sides of the machine-frame. The transverse shaft 23 in addition to supporting the said rollers 21 forms the hinge-support for a plurality of fingers 24, which bear by gravity against the lower end of the frame. These fingers will preferably be serrated at their lower ends, as shown, and will having metal wearing-plates 25. The fingers will extend a short distance below the frame and will contact with the fodder. In going toward the front of the machine the fingers will raise up and ride over the stalks; but on the return or backward movement they will be forced down until arrested by the frame and will thereby dig into the fodder in a manner to insure a good hold thereon. The object in having a plurality of fingers rather than a single continuous plate is to allow for adjustment against quantities of fodder the stalks of which are not uniformly laid across the machine. The flexible fingers also permit us to feed dry fodder-stalks without danger of breaking them, for as soon as the snapping-rolls catch the stalks the fingers release their hold on the stalks and allow the latter to pass through the snapping-rolls without any breakage to said stalks.

In order to cause the above-described pushing device to rise on the return stroke above the position it could assume if the rollers 21 were constantly on a horizontal track, we provide for elevating the forward ends of the tracks 24ª. To this end the tracks are hinged at their opposite or rear ends at 26, and the end of each track is bent up from said hinge approximately at right angles to the body portion of the track to form the parts 27. Contact of the rollers with these ends 27 cause the front free ends of the tracks to rise in the manner shown by the full lines in Figs. 1 and 2 of the drawings, and these elevated positions are held by the levers 28, having shoulders or notches 29, which engage the ends of the tracks and hold them in elevated positions until the levers 28 are pushed away by contact therewith of the rollers 21 on the front travel thereof. The top ends of lever 28 extend back into the paths of said rollers in order to cause them to trip said levers. On the forward travel of the rollers they move up the incline formed by the elevation of the front ends of the tracks, and by this movement up the inclines the frame and fingers 24 are raised over a thicker bunch of fodder than could otherwise be handled. By the backward stroke of the fingers the top stalks of the bunch are pushed back to the snapping-rolls. The levers 28 are held by the spring 29 constantly against the adjacent ends of the tracks, so as to be in constant readiness to lock the track in elevated position when said tracks are raised, as above described. It will be seen in Fig. 1 that the end 27 of the track is curved, which allows the pusher to adjust itself to the thickness of fodder below it and yet places the rollers 21 constantly against the curved track in position to raise the free end of the track. The operations of setting the track and of tripping it are wholly automatic.

Having thus fully described our invention, what we claim as new, and wish to secure by Letters Patent, is—

1. In a feed mechanism, a carrier, a revoluble crank-shaft above the carrier, a frame hinged to the crank-shaft having serrated fingers bearing against the lower end of the frame and hinged to swing upwardly therefrom, said frame extending rearwardly from the shaft at an oblique angle to the carrier and a track above the lower end of the frame from which said frame end is supported.

2. In a feed mechanism, a carrier, a revoluble crank-shaft above the carrier, a frame hinged to the crank-shaft having fingers at its lower end, said frame extending obliquely toward the rear of the machine, a track above the lower end of the frame, rollers on said track, and means for suspending the lower end of the frame from said rollers.

3. In a feed mechanism, a carrier, a revoluble crank-shaft above the carrier, a frame hinged to the crank-shaft having fingers at its lower end, said frame extending obliquely toward the rear of the machine, a track above the lower end of the frame, rollers on said track, means for suspending the lower end of the frame from said rollers, said track having vertical adjustment of its front end, means for elevating said end during the travel in that direction of said rollers and means for lowering said raised ends during the return of the rollers.

4. In a feed mechanism, a carrier, a pusher-frame having a reciprocating movement in an oblique direction toward said carrier, and a plurality of fingers hinged at their upper ends above the frame and bearing at their lower ends against the lower end of said frame, said fingers having serrated lower ends.

5. In a feed mechanism, a carrier, a revoluble crank-shaft above the carrier, a frame hinged to the crank-shaft having fingers at its lower end, said frame extending obliquely toward the rear of the machine, a track or tracks above the lower end of the frame hinged at their inner ends to the frame of the machine, rollers on said track from which rollers the lower end of the frame is suspended, means consisting of an upwardly-bent portion located at the hinged end of the tracks against which the rollers contact when moved in the direction of said upward portions thereby raising the tracks to oblique positions, a spring-pressed lever at the end of each track having shoulders to lock the raised track until released by the impact of the rollers with said levers on the return travel or travel of said rollers in the direction of the levers.

In witness whereof I have hereunto set my hand and seal this 27th day of September, A. D. 1902.

FREEMAN M. TEEGUARDEN. [L. S.]

Witnesses:
FRANK B. COYNER,
WILLIAM WARREN.

In witness whereof I have hereunto set my hand and seal this 27th day of September, A. D. 1902.

WILLIAM R. TEEGUARDEN. [L. S.]

Witnesses:
JOSEPH A. MINTURN,
JOHN B. SHERWOOD.